Jan. 18, 1927.
R. B. BUKOLT
1,614,824
HAND PROPELLED CHILD'S VEHICLE
Filed May 17, 1926   2 Sheets-Sheet 1
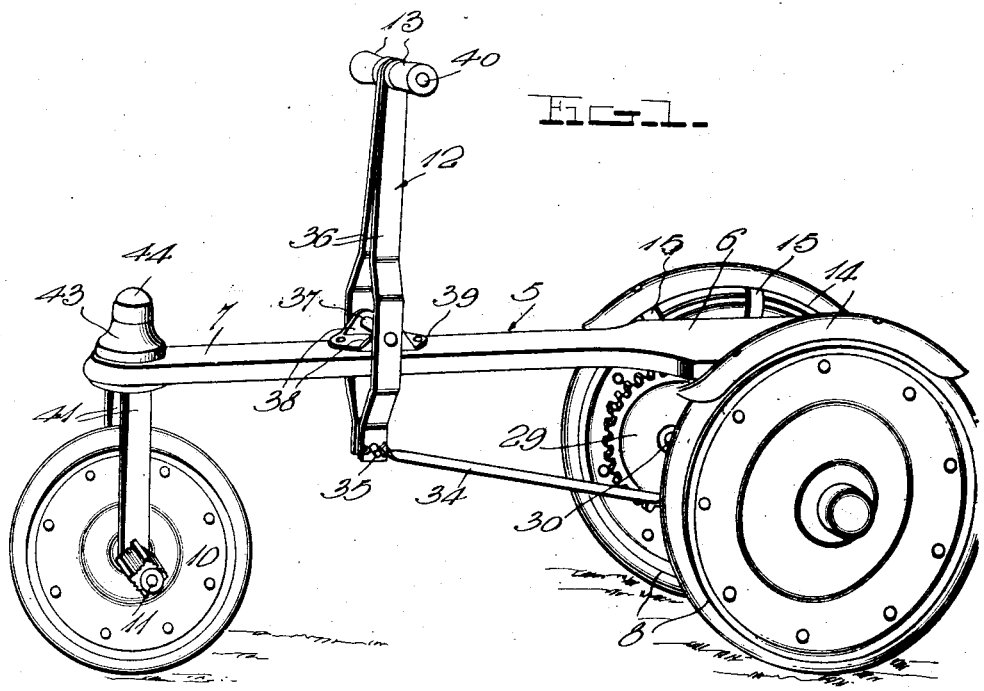
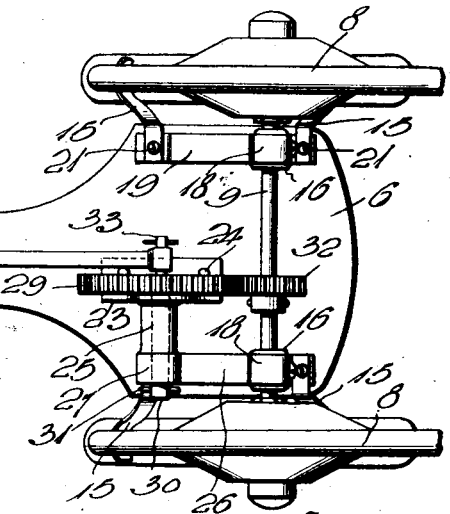
Witness
H. Woodard
Inventor
R. B. Bukolt
By H. R. Wilson & Co.
Attorneys Jan. 18, 1927.
R. B. BUKOLT
1,614,824
HAND PROPELLED CHILD'S VEHICLE
Filed May 17, 1926   2 Sheets-Sheet 2
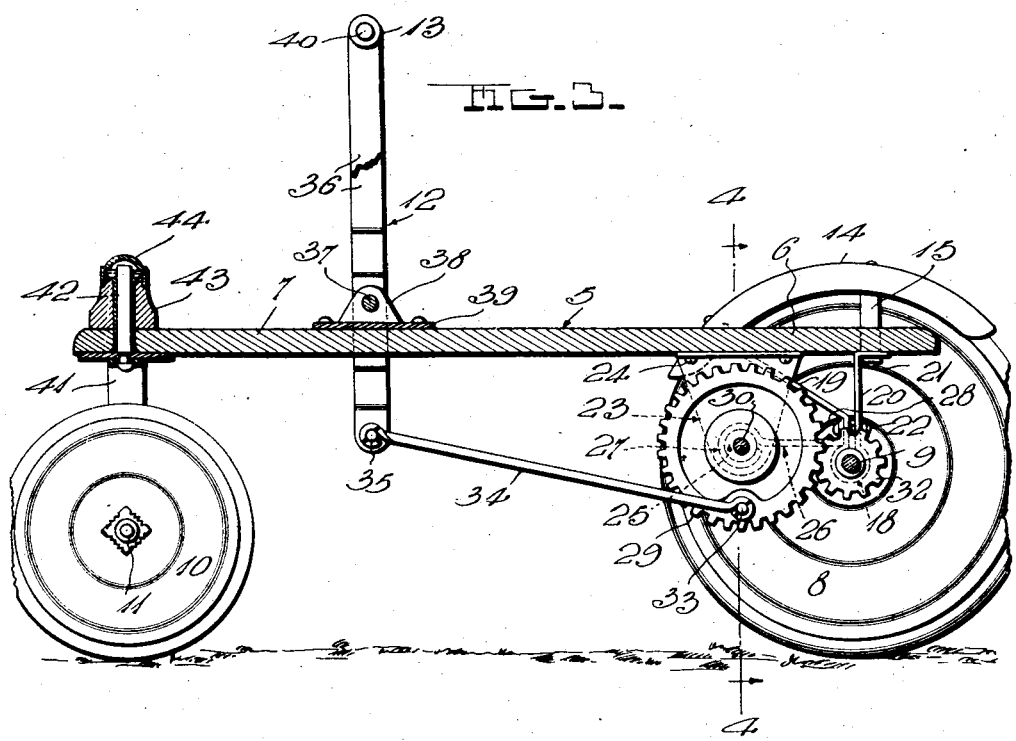
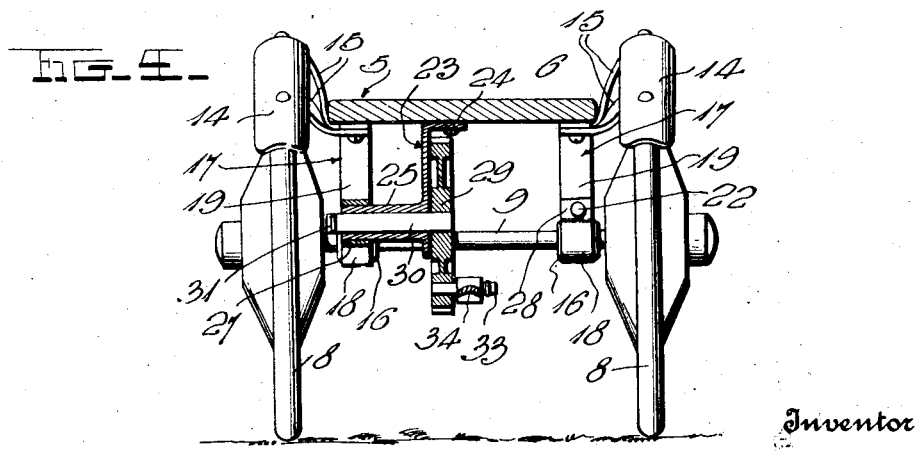
Witness
H. Woodard
Inventor
R. B. Bukolt
By H. B. Wilson Yeo
Attorneys Patented Jan. 18, 1927.

1,614,824

UNITED STATES PATENT OFFICE.

ROMAN B. BUKOLT, OF STEVENS POINT, WISCONSIN.

HAND-PROPELLED CHILD'S VEHICLE.

Application filed May 17, 1926. Serial No. 109,658.

The invention relates to improvements in children's vehicles of the general type steered by the feet and propelled by oscillation of a hand lever.

One object of the invention is to provide a generally improved and simplified construction for a vehicle of this type, in which only three wheels are necessary and in which the body of the vehicle may be cut from a single board to form a relatively wide rear or seat portion and a relatively long and narrow shank portion extending forwardly therefrom, this shank portion being straddled by portions of the operating lever.

Another object of the invention is to provide a vehicle of the type set forth in which fenders for the rear wheels are disposed at the longitudinal edges of the seat and extend upwardly above the latter, so as to hold the child against sliding sideways from the device.

Yet another object is to provide a novel construction and arrangement of parts for mounting the rear axle of the vehicle and driving means therefor.

With the foregoing and minor objects in view, the invention resides in the novel subject matter hereinafter described and claimed, the description being supplemented by the accompanying drawings.

Fig. 1 is a perspective view of a vehicle constructed in accordance with my invention.

Fig. 2 is a bottom plan view.

Fig. 3 is a central longitudinal sectional view.

Fig. 4 is a vertical transverse section on the plane of line 4—4 of Fig. 3.

In the drawings above briefly described, the numeral 5 designates the body of the vehicle, said body being sawed from a single wooden board so as to provide a relatively wide rear or seat portion 6 and a comparatively long and narrow shank or reach portion 7 which projects forwardly from said rear portion. Two wheels 8 and a connecting axle 9 are utilized in supporting the rear end of the body 5 and only a single front wheel 10 is employed, this front wheel being provided with laterally projecting foot pedals 11 for steering purposes only. A hand lever 12 straddles and is fulcrumed to the intermediate portion of the shank or reach 7 and is provided at its upper end with laterally projecting hand grips 13 while the lower end of this lever is connected with driving mechanism for the rear wheels 8, so that the vehicle may be propelled by oscillation of said lever 12, whereas steering is effected solely by turning of the front wheel 10 with the foot pedals 11.

Two fenders 14 which are arched both longitudinally and transversely, are provided for the rear wheels 8, said fenders being disposed at the longitudinal edges of the seat 6 and projecting upwardly above the plane of said seat, so as to form side guards for the child sitting upon the seat, preventing him from sliding sideways off of the same. These fenders are preferably of the formation shown and they may be secured to the body 5 by appropriate fender brackets 15.

The axle 9 is rotatably mounted in roller bearings 16, which bearings are held by brackets 17 secured to the lower side of the seat 6. Each of these brackets is formed from a single metal strap bent to provide a bearing holding sleeves 18 and two arms 19 and 20 diverging upwardly from said sleeve, these arms being secured to the seat 6 by screws 21, and these same screws may be used for fastening the fender brackets 15. In order to contract the sleeve 18 and thus clamp the bearings 16 tightly therein, bolts 22 pass through the lower portions of the arms 19 and 20 and I make use of one of these bolts to perform an additional function, hereinafter described.

Secured to the lower side of the seat 6 in advance of the major portions of the brackets 17 and in a plane between said brackets, is a third bracket 23 which is preferably in the form of an inverted L-shaped plate with its horizontal portion secured to the seat 6 by screws or the like 24. The lower end of this bracket 23 is provided with a laterally projecting horizontal bearing 25 which is preferably integral with it. The free end of this bearing is positioned in advance of one of the brackets 17 and is rigidly connected to the front end of a longitudinally disposed spacing bar 26, the rear end of this spacing bar being anchored to said bracket 17 by its bolt 22. By this arrangement, the bearing 25 and the axle 9 are held in spaced parallel relation and it will be seen that said bearing is sturdily supported. Preferably, the spacing bar 26 has its front end bent to form a ring 27 which snugly surrounds the free or outer end of the bearing 25, and the rear end of said spacing bar is upwardly bent to provide an ear 28 through which the bolt 22 passes.

At the side of the bracket 23, remote from the bearing 25, a driving gear 29 is positioned, said gear having a supporting shaft 30 which passes through said bearing and is held against withdrawal therefrom by a suitable pin or the like 31. This gear meshes with a pinion 32 secured upon the axle 9, and said gear is provided with a wrist pin 33 to which is connected the rear end of a pitman rod 34, the front end of this rod being pivoted at 35 to the lower end of the lever 12. It will thus be seen that oscillation of the lever will reciprocate the rod 34, causing rotation of the gear 29, which movement will drive the pinion 32, thus rotating the axle 9 and the wheels 8, the latter being of course secured to said axle.

The body portion of the lever 12 preferably comprises two metal bars 36 having portions bowed away from each other to straddle the reach or shank 7, these portions being fulcrumed at 37 to ears 38 which are bent upwardly from a plate 39, the latter being secured upon said reach or shank. At their lower ends, the bars 36 are connected by the pivots 35, and the upper ends of these bars are preferably secured together by a long rivet 40 which passes through the hand grips 13 and through said bars.

The front wheel 10 is rotatably mounted in a fork 41 having an upstanding spindle 42 which is rotatably mounted in an appropriate bearing 43, said bearing preferably having a cap 44 at its upper end.

By employing the novel construction shown and described, or a substantial equivalent thereof, a very sturdy and desirable child's vehicle is produced, at comparatively small cost, and it will be seen that the device may be easily propelled with the hands and steered with the feet.

As excellent results have been obtained from the details disclosed, they are preferably followed. However, within the scope of the invention as claimed, variations may be made.

I claim:—

1. A child's vehicle comprising a single board having a relatively wide rear end portion forming a seat, and a comparatively long and narrow shank portion projecting forwardly from said seat; a pair of rear wheels and a rear axle supporting the rear end of the board, a single dirigible front wheel supporting the front end of said board, and fenders for said rear wheels disposed at the longitudinal edges of said seat and arched above the plane of said seat.

2. A child's vehicle comprising a single board having a relatively wide rear end portion forming a seat, and a comparatively long and narrow shank portion projecting forwardly from said seat; a pair of rear wheels and a rear axle supporting the rear end of the board, a single dirigible front wheel supporting the front end of said board, a hand lever striding and fulcrumed to said shank and shaped at its upper end to be gripped by hand, and driving means for the rear wheels connected with the lower end of said lever.

3. In a child's vehicle, a seat board, a pair of axle brackets secured to the lower side thereof, a third bracket secured to the lower side of said board in advance of and in a plane between said axle brackets, a horizontal shaft bearing joined rigidly to and projecting laterally from said third bracket, and a spacing bar connected at its front end to the outer end of said bearing and anchored at its rear end to one of said axle brackets.

4. In a child's vehicle, a seat board, a pair of axle brackets secured to the lower side thereof and each comprising a metal strap bent to form a retainer sleeve for an axle bearing and attaching arms diverging upwardly from said sleeve, bolts passing through the attaching arms of said brackets to contract the sleeves thereof, a third bracket secured to the lower side of the seat board in advance of and in a plane between said axle brackets, a horizontal shaft bearing joined rigidly to and projecting laterally from said third bracket, and a spacing bar connected at its front end with the outer end of said bearing and anchored at its rear end to one of said axle brackets by the sleeve-contracting bolt of the latter.

In testimony whereof I have hereunto affixed my signature.

ROMAN B. BUKOLT.